(12) United States Patent
Murakami et al.

(10) Patent No.: US 8,537,530 B2
(45) Date of Patent: Sep. 17, 2013

(54) ELECTRONIC DEVICE

(75) Inventors: Mitsuhiro Murakami, Ome (JP); Shigeki Nishiyama, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 270 days.

(21) Appl. No.: 12/911,608

(22) Filed: Oct. 25, 2010

(65) Prior Publication Data
US 2011/0211306 A1    Sep. 1, 2011

(30) Foreign Application Priority Data

Feb. 26, 2010   (JP) ................................ 2010-042979

(51) Int. Cl.
*G06F 1/16*   (2006.01)

(52) U.S. Cl.
USPC ............ 361/679.17; 361/679.08; 361/679.09; 341/22; 345/168

(58) Field of Classification Search
USPC .................................................... 361/679.17
See application file for complete search history.

(56) References Cited

U.S. PATENT DOCUMENTS

| 5,333,961 | A | * | 8/1994 | Capigatti et al. ............. 400/490 |
| 6,805,505 | B2 | | 10/2004 | Horiuchi et al. |
| 6,972,946 | B2 | | 12/2005 | Hamada et al. |
| 7,519,176 | B2 | | 4/2009 | Akatsu |
| 7,825,899 | B2 | * | 11/2010 | Chen ............................ 345/168 |
| 8,027,156 | B2 | * | 9/2011 | Kobayashi et al. ...... 361/679.17 |
| 2004/0247113 | A1 | | 12/2004 | Akatsu |
| 2009/0279238 | A1 | | 11/2009 | Kobayashi et al. |

FOREIGN PATENT DOCUMENTS

| JP | H07-064670 A | 3/1995 |
| JP | H10-091305 | 4/1998 |
| JP | 2003-122476 A | 4/2003 |
| JP | 2004-235736 | 8/2004 |
| JP | 2005-070970 A | 3/2005 |
| JP | 2009-294809 | 12/2009 |

OTHER PUBLICATIONS

Notice of Reasons for Rejection mailed by the Japan Patent Office on May 17, 2011 in the corresponding Japanese application No. 2011-084478 in 8 pages.

* cited by examiner

*Primary Examiner* — Anthony Q Edwards
(74) *Attorney, Agent, or Firm* — Knobbe Martens Olson & Bear, LLP

(57) ABSTRACT

According to one embodiment, an electronic device incorporates a housing, and a keyboard unit attached to the housing. The keyboard unit includes a plate-like base, a plurality of keys mounted on the base, a base cover including a plurality of through holes through which the keys are inserted, and a plurality of peripheral surfaces defining four sides of each of the through holes, and a hook portion provided in one of the peripheral surfaces of the base cover, and used to detach the keyboard unit from the housing.

16 Claims, 6 Drawing Sheets

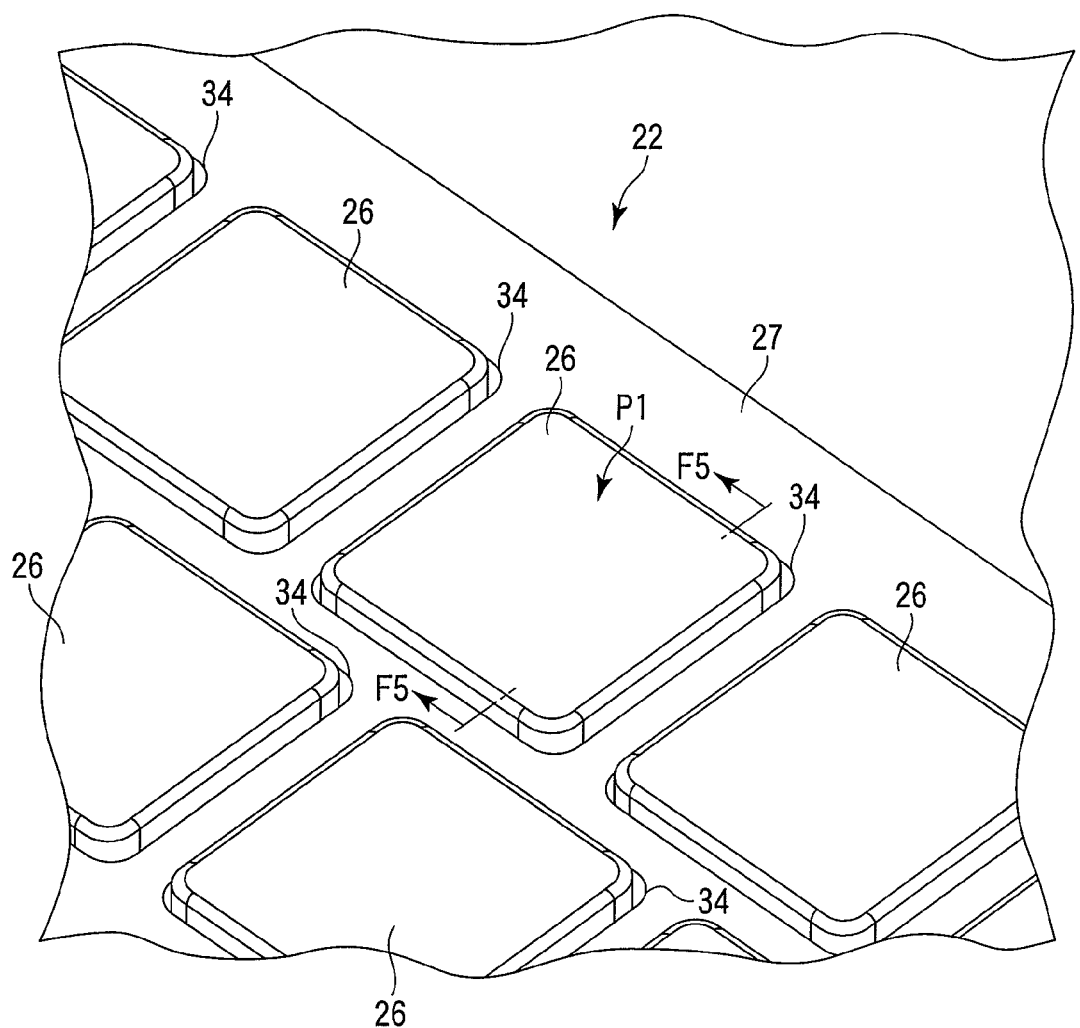
F I G. 3

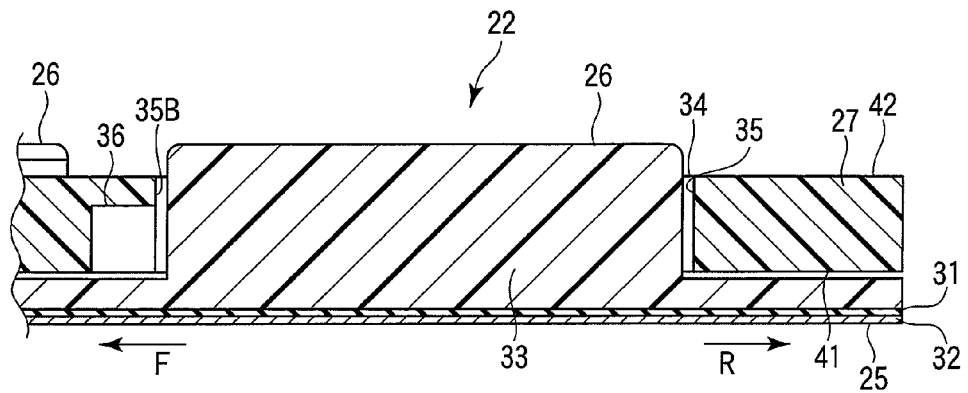
F I G. 7
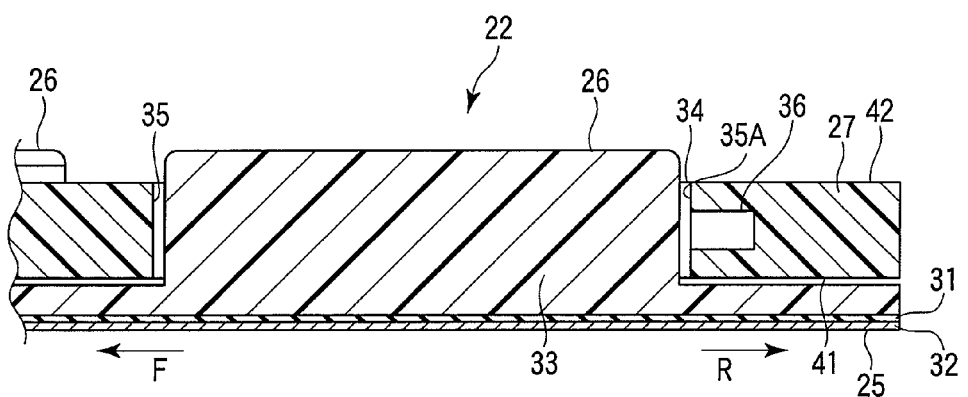
F I G. 8
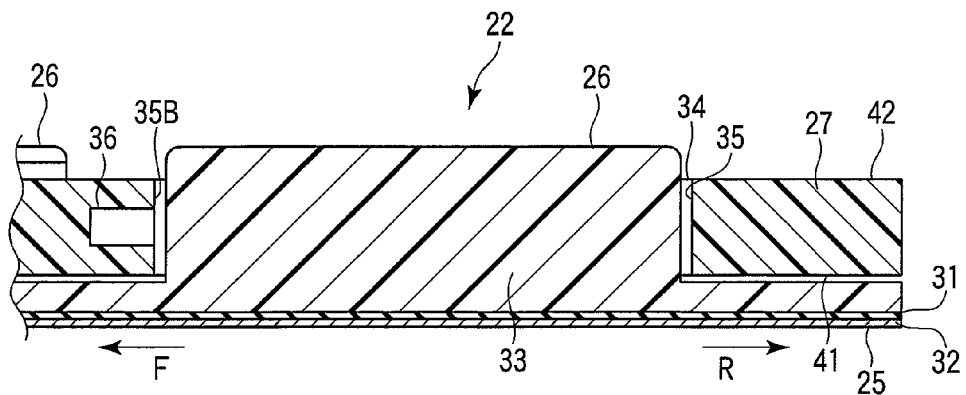
F I G. 9

ELECTRONIC DEVICE

CROSS-REFERENCE TO RELATED APPLICATIONS

This application is based upon and claims the benefit of priority from Japanese Patent Application No. 2010-042979, filed Feb. 26, 2010; the entire contents of which are incorporated herein by reference.

FIELD

Embodiments described herein relate generally to an electronic device with a keyboard unit.

BACKGROUND

Jpn. Pat. Appln. KOKAI Publication No. 7-64670 discloses an information processing apparatus in which a keyboard unit is secured to the upper surface of a housing. More specifically, the information processing apparatus comprises a housing with a recess, and a keyboard unit fitted in the recess. The keyboard unit has a first claw portion provided on the rear side, and a concave portion provided on the front side. The peripheral portion of the housing around the recess has a hole for inserting the first claw portion therein, and a second claw portion received in the concave portion.

In the information processing apparatus, firstly, the first claw portion provided on the rear side of the keyboard unit is inserted into the hole of the housing, and then the front side of the keyboard unit is pushed into the housing. As a result, the second claw portion of the keyboard unit is fitted into the concave portion of the housing, whereby the keyboard is secured to the housing. When detaching the keyboard unit from the housing, the keyboard unit is raised from below by inserting, for example, a finger into a receiving portion provided near the keyboard unit for receiving an optical disk device.

However, if such a receiving portion is not located near the keyboard unit unlike the above-described information processing apparatus, it would be difficult to detach the keyboard unit.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary enlarged perspective view illustrating part of the keyboard unit incorporated in the portable computer of FIG. 1;

FIG. 7 is an exemplary sectional view taken along the vertical axis of the keyboard unit of a portable computer according to a second embodiment;

FIG. 8 is an exemplary sectional view taken along the vertical axis of the keyboard unit of a portable computer according to a third embodiment; and FIG. 9 is an exemplary sectional view taken along the vertical axis of the keyboard unit of a portable computer according to a fourth embodiment.

DETAILED DESCRIPTION

Various embodiments will be described hereinafter with reference to the accompanying drawings.

In general, according to one embodiment, an electronic device incorporates a housing, and a keyboard unit attached to the housing. The keyboard unit includes: a plate-like base; a plurality of keys mounted on the base; a base cover including a plurality of through holes through which the keys are inserted, and a plurality of peripheral surfaces defining four sides of each of the through holes; and a hook portion provided in one of the peripheral surfaces of the base cover, and used to detach the keyboard unit from the housing.

Referring to FIGS. 1 to 6, an electronic device according to a first embodiment will be described. In this specification, the near side to the user (that is, user side) is defined as front F, the far side from the user is rear R, the left-hand side of the user is left, the right-hand side of the user is right, the upper side from the user's position is up and the lower side from the user's position is down.

Figure 1:
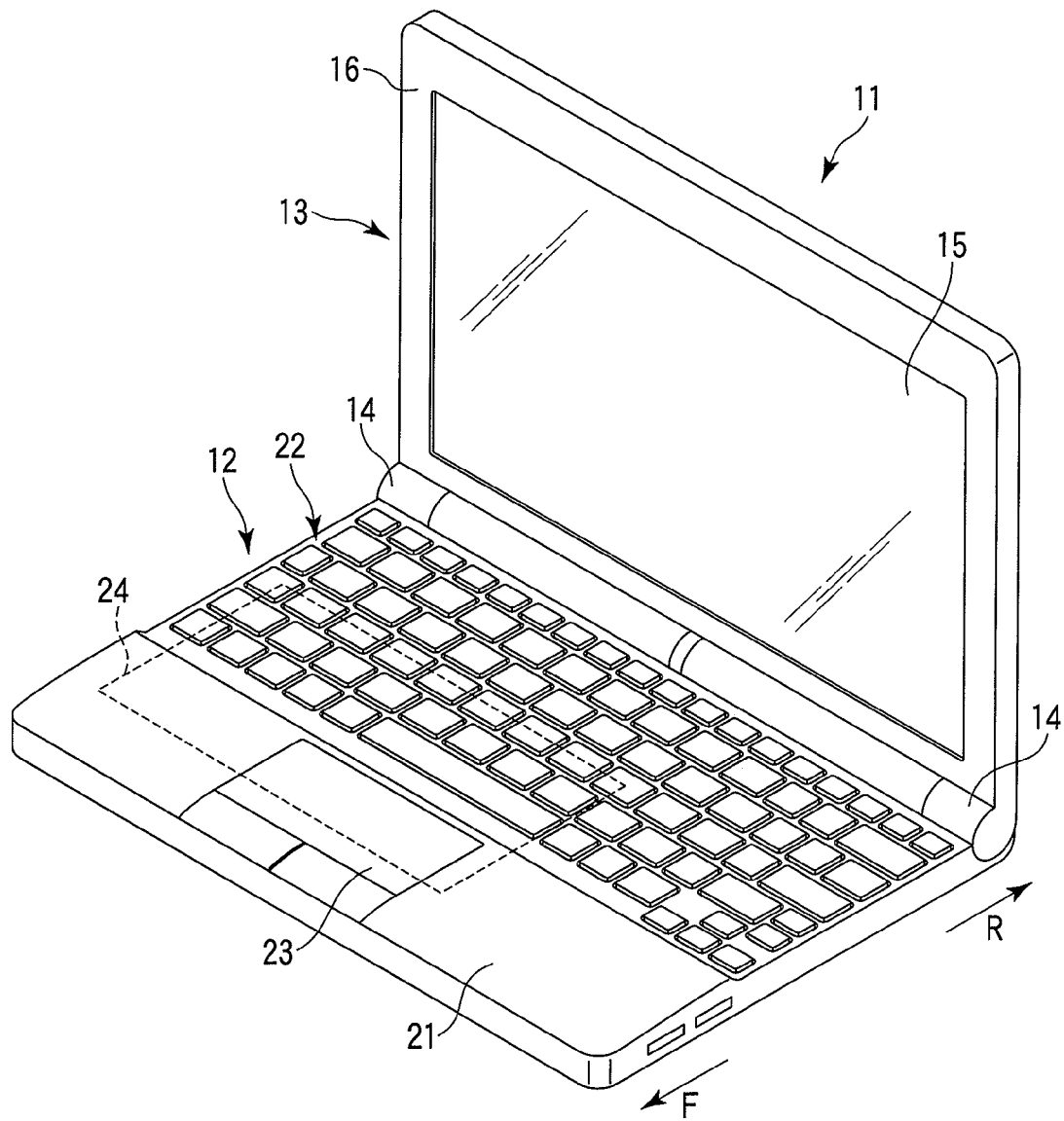
FIG. 1 is an exemplary perspective view illustrating a portable computer according to a first embodiment of the invention.

As shown in FIG. 1, a portable computer 11 as an example of the electronic device comprises a main unit 12, a display unit 13, and hinges 14 interposed between the main unit 12 and the display unit 13. The hinges 14 support the display unit 13 rotatable. In other words, the hinges 14 couples a main unit case (first housing) 21 to a display case (second housing) 16 such that these cases can angularly move relative to each other.

The display unit 13 comprises a display 15 as an example of a display device having a display surface, and the display case (second housing) 16 that surrounds the display 15 and is formed of a synthetic resin. In this embodiment, the display 15 is a liquid crystal display. The display case 16 may be formed of a metal.

As shown in FIGS. 1 to 4, the main unit 12 comprises the main unit case (first housing) 21 that, for example, has a box shape and is formed of a synthetic resin, a keyboard unit 22 secured to the upper surface of the main unit case 21, a touch pad 23 provided on the upper surface of the main unit case 21, and a printed circuit board 24 received in the main unit case 21. In the embodiment, the housing includes the main unit case 21 and the display case 16. The main unit case 21 may be formed of a metal.

Figure 2:
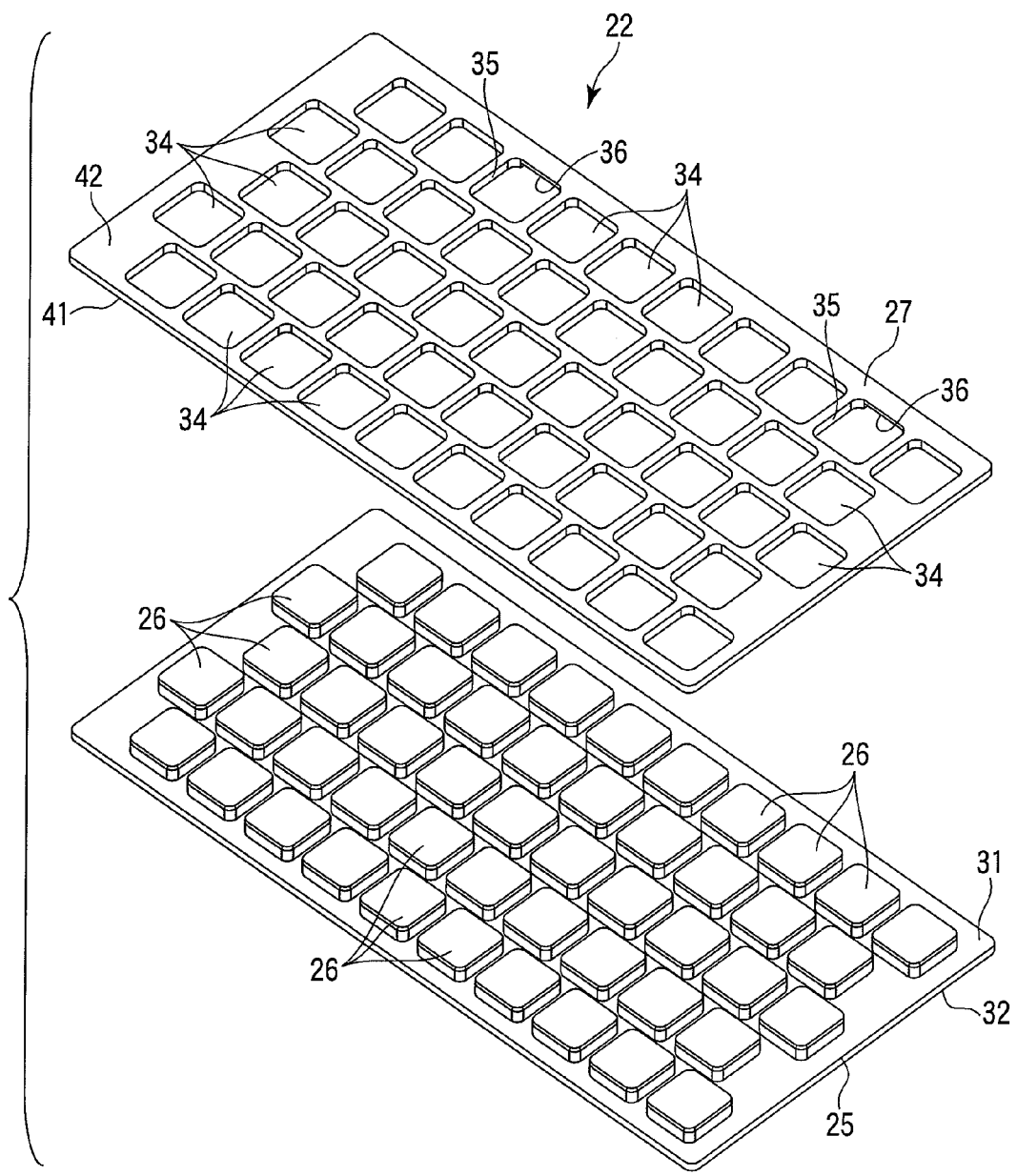
FIG. 2 is an exemplary exploded perspective view illustrating a keyboard unit incorporated in the portable computer of FIG. 1.
Figure 4:
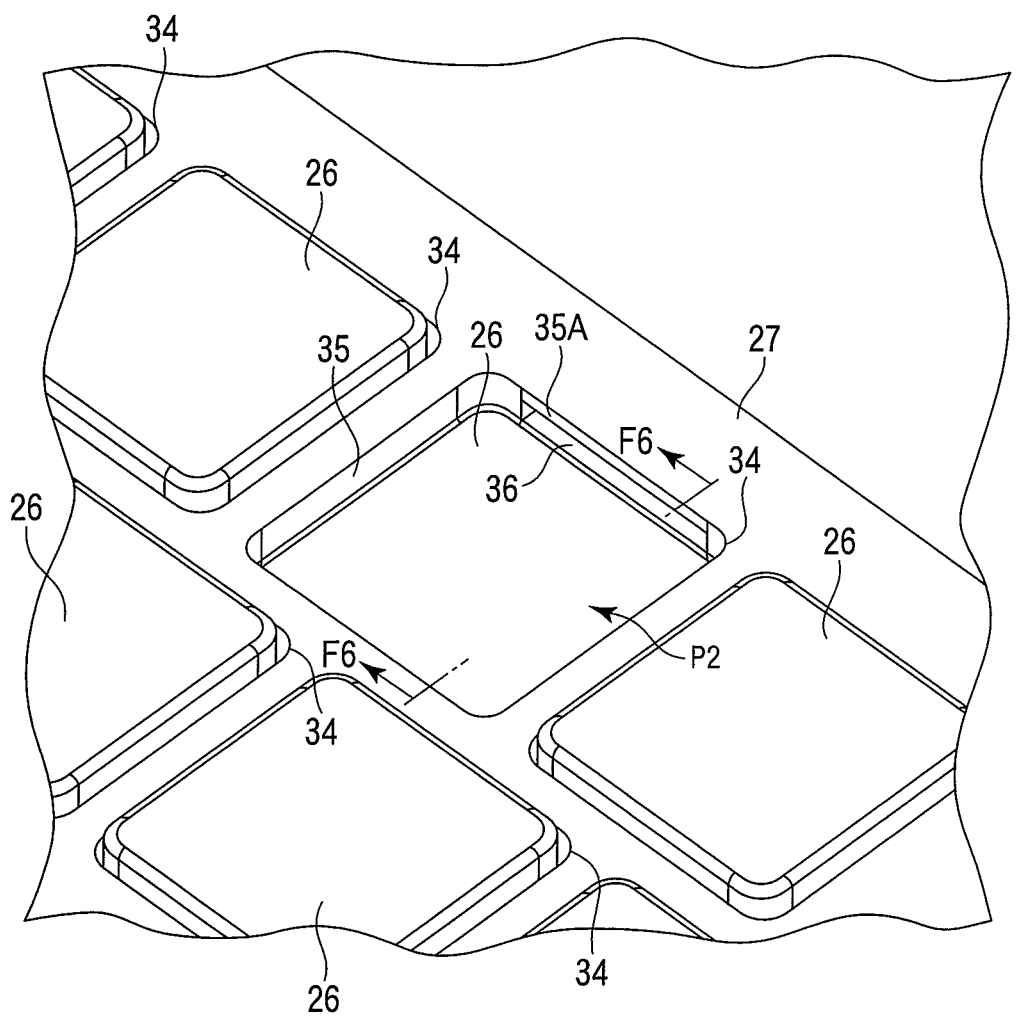
FIG. 4 is an exemplary perspective view illustrating a state in which a key of the keyboard unit shown in FIG. 3 is pressed by a finger.

As shown in FIGS. 2 to 4, the keyboard unit 22 comprises a plate-like base 25, a plurality of keys 26 provided on the base 25, and a base cover (cover member) 27 covering the upper surface of the base 25. The base 25 comprises a switch board 31 that can detect pressing of each key 26, and a metal reinforcing plate 32 that reinforces the switch board 31 from its reverse side.

Figure 5:
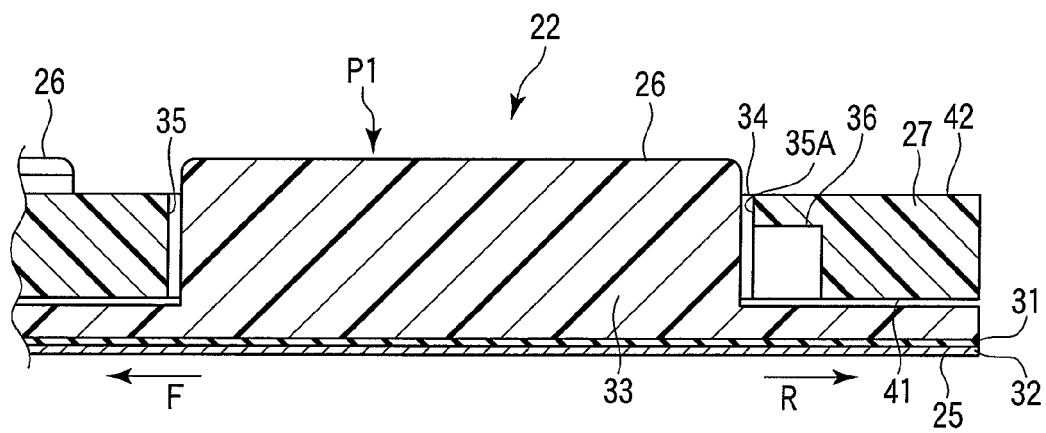
FIG. 5 is an exemplary sectional view taken along line F5-F5 of FIG. 3.

As shown in FIG. 5, each key 26 is supported by, for example, a support portion 33 formed of an elastic synthetic resin, and can be pressed down by a finger. Each key 26 can be movable between a first position P1 in which it is exposed to the outside, and a second position P2 in which it is retracted in the main unit case (first housing) 21. Note that FIGS. 2 and 3 schematically show the keyboard unit 22, and hence the arrangements of the keys 26 shown in these figures differ from that of FIG. 1.

The base cover 27 is formed of the same synthetic resin as the main unit case 21. The base cover 27 is secured to the base 25 by screws or welding. As shown in FIG. 1, when the base cover 27 is attached to the main unit case 21, it is level with the portion of the main unit case 21 surrounding the base cover. This enhances the appearance.

The base cover 27 is flat and has a plurality of rectangular through holes (first openings) 34. As shown in FIG. 3, the keys 26 are inserted through the through holes 34. As shown in FIG. 4, the base cover 27 comprises peripheral surfaces (edges) 35 that define the four edges of each through hole 34, and hook portions 36 provided at the peripheral surfaces 35. By inserting detachment tools or fingers into the hook portions 36, the keyboard unit 22 can be detached from the main unit case 21. Further, as shown in FIG. 2, the base cover 27 has a first surface 41 to be brought into contact with the base 25, and a second surface 42 opposite to the first surface 41.

As shown in FIG. 2, the peripheral surfaces 35 of the through holes 34 at the deepest (rearmost) row have the hook portions 36. More specifically, the peripheral surfaces 35 of the two of the through holes 34 of the rearmost row, which are located near the opposite end (rightmost and leftmost) holes, have the hook portions 36.

In the first embodiment, the hook portions 36 are notches formed by cutting part of the corresponding peripheral surfaces 35 and part of the first surface 41. As shown in FIG. 5, the hook portions 36 provide stepped portions at the first surface 41. The hook portions (second openings) 36 are located closer to the hinges 14 than the support portions 33, and provided in the rear surfaces 35A of the corresponding peripheral surfaces 35.

Although in the first embodiment, the hook portions 36 are formed in the peripheral surfaces 35 of the two through holes 34 of the rearmost row located near the opposite end (rightmost and leftmost) holes, the locations of the hook portions 36 are not limited to them, but may be determined freely. For instance, if the keyboard unit 22 is a large one that includes a so-called ten-key unit, another hook portion 36 may be formed in the peripheral surface 35 of the middle through holes 34 of the rearmost row, in addition to the hook portions formed in the peripheral surfaces 35 of the two of the through holes 34 of the rearmost row, which are located near the opposite end (rightmost and leftmost) holes. Namely, three hook portions 36, in total, may be provided.

Figure 6:
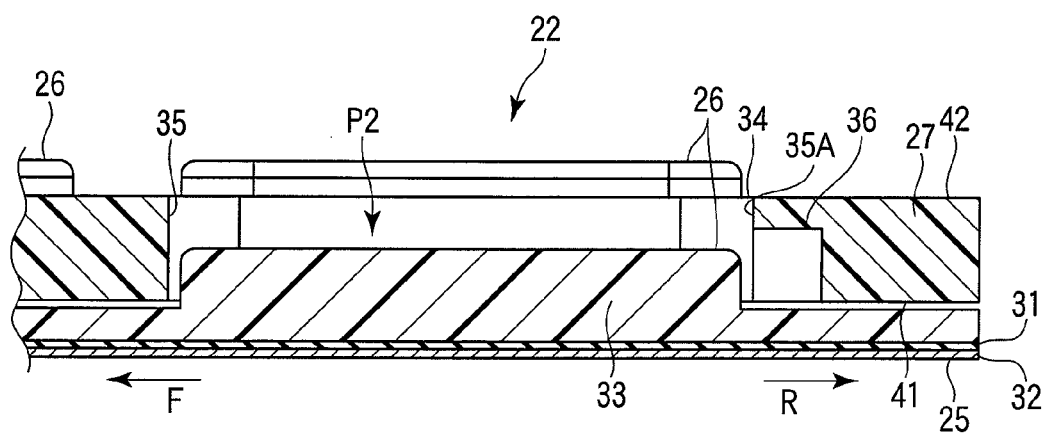
FIG. 6 is an exemplary sectional view taken along line F6-F6 of FIG. 4.

Referring now to FIGS. 4 and 6, a description will be given of the process of detaching the keyboard unit 22. As shown, when an operator presses the key 26 down to the second position P2, the hook portion (second opening) 36 is exposed to the outside. In this state, detachment tools (jig) or fingers are inserted into the hook portion 36 to raise the keyboard unit 22 and release the engagement between the keyboard unit 22 and the main unit case 21 by, for example, a lock claw (not shown), thereby detaching the keyboard unit 22.

In the first embodiment, the electronic device comprises the housing, and the keyboard unit 22 attached to the housing. The keyboard unit 22 comprises the plate-like base 25, the plurality of keys 26 provided on the base 25, the base cover 27 provided with the plurality of through holes 34 through which the keys 26 are inserted, and the peripheral surfaces 35 that define the four edges of each through hole 34, and the hook portions 36 provided in some of the peripheral surfaces 35 and used to detach the keyboard unit.

In this structure, since the hook portions 36 provided in some of the peripheral surfaces 35, they are invisible during normal use. This does not need a member, such as a decorative sheet, for concealing the hook portions 36, thereby reducing the number of required component parts and enhancing the appearance of the portable computer 11. Further, the keyboard unit 22 can be easily detached by inserting detachment tools or fingers into the hook portions 36.

Further, the base cover 27 has the first surface 41 contacting the base 25 and the second surface 42 opposite to the first surface 41, and the hook portions 36 are notches formed by cutting part of the corresponding peripheral surfaces 35 and part of the first surface 41. By virtue of this structure, the hook portions 36 can be concealed from the outside, and be made simple in structure.

Furthermore, since the hook portions (second openings) 36 are located closer to the hinges 14 than the support portions 33, the operator can insert their fingers or detachment tools into the hook portions 36 while seeing the hook portions, which enhances the efficiency of detaching the keyboard unit 22.

Referring then to FIG. 7, an electronic device according to a second embodiment will be described. A portable computer 11 as an example of the second embodiment differs from the first embodiment in the locations of the hook portions 36, and is similar to the latter in the other portions. Therefore, the elements different from those of the first embodiment will be mainly described, while the like elements will be denoted by like reference numbers and will not be described. The portable computer 11 of the second embodiment has an appearance similar to that shown in FIG. 1.

In the second embodiment, the hook portions 36 are notches formed by cutting part of the corresponding peripheral surfaces 35 and part of the first surface 41. As shown in FIG. 7, the hook portions 36 provide stepped (concave) portions at the first surface 41. The hook portions 36 are formed in the front surfaces 35B of the corresponding peripheral surfaces 35.

In the second embodiment, the hook portions 36 are located more remotely from the hinges 14 than the support portions 33, and provided in the front surfaces 35B of the corresponding peripheral surfaces 35. By virtue of this structure, the hook portions 36 can be located so that they will not be seen by a user even when the keys 26 are pressed down. This further enhances the appearance of the portable computer 11.

Referring then to FIG. 8, an electronic device according to a third embodiment will be described. A portable computer 11 as an example of the third embodiment differs from the first embodiment in the shape of the hook portions 36, and is similar to the latter in the other portions. Therefore, the elements different from those of the first embodiment will be mainly described, while the like elements will be denoted by like reference numbers and will not be described. The portable computer 11 of the third embodiment has an appearance similar to that shown in FIG. 1.

In the third embodiment, the hook portions 36 are provided as grooves formed in the corresponding peripheral surfaces 35. More specifically, the hook portions 36 are grooves provided in the rear surfaces 35A of the corresponding peripheral surfaces 35 and extending along the width of the main unit case 21.

To detach the keyboard unit 22, the operator presses down the keys 26 by their fingers to expose the hook portions 36 to the outside. In this state, detachment tools or fingers are inserted into the hook portion 36 to raise the keyboard unit 22 and release the engagement between the keyboard unit 22 and the main unit case 21 by, for example, a lock claw (not shown), thereby detaching the keyboard unit 22.

In the third embodiment, the hook portions 36 are grooves formed in the corresponding peripheral surfaces 35. Even when the hook portions 36 are thus provided as grooves, the keyboard unit 22 can be easily detached by inserting detachment tools or fingers into the hook portions 36. Further, since the hook portions 36 as the grooves are concealed by the keys 26, the appearance of the portable computer 11 can be enhanced.

Referring last to FIG. 9, an electronic device according to a fourth embodiment will be described. A portable computer 11 as an example of the fourth embodiment differs from the third embodiment in the locations of the hook portions 36, and is similar to the latter in the other portions. Therefore, the elements different from those of the third embodiment will be mainly described, while the like elements will be denoted by like reference numbers and will not be described. The portable computer 11 of the fourth embodiment has an appearance similar to that shown in FIG. 1.

In the fourth embodiment, the hook portions 36 are provided as grooves formed in the front surfaces 35B of the corresponding peripheral surfaces 35.

By virtue of this structure, the hook portions 36 can be located so that they will not be seen by a user even when the keys 26 are pressed down. This further enhances the appearance of the portable computer 11.

The electronic device is not limited to the portable computer 11 employed in the embodiments, but may be other types of devices, such as a portable telephone. The shape of the hook portions 36 is not limited to the notches or grooves, but may be any other one if the detachment tools or fingers can be inserted therein. The electronic device can be modified in various ways without departing from the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a housing; and
a keyboard unit attached to the housing,
the keyboard unit comprising:
   a base;
   a plurality of keys projecting from the base; and
   a base cover comprising a plurality of through holes through which the keys are inserted, and a hook portion provided in one of peripheral surfaces of the through holes and used to detach the keyboard unit wherein at least a portion of the hook portion is exposed to an outside when the keys are pressed down and wherein the hook portion is not exposed to an outside when the keys are not pressed down.

2. The electronic device of claim 1, wherein the hook portion is formed in a palm-rest side surface of the peripheral surface.

3. The electronic device of claim 1, wherein
the base cover comprises a first surface facing the base, and a second surface opposite to the first surface; and
the hook portion is a notch formed by cutting a portion of the one peripheral surface and a portion of the first surface.

4. The electronic device of claim 1, wherein each of the keys has peripheral wall facing the peripheral surface.

5. The electronic device of claim 1, wherein the hook portion is provided near an end of a length of the keyboard unit.

6. The electronic device of claim 1, wherein
the keyboard unit includes a ten-key; and
the through holes include a certain number of through holes arranged in a rearmost one of the rows, and two through holes arranged near opposite ends of the rearmost row, and one through hole arranged near a center of the rearmost row, are defined by peripheral surfaces provided with the hook portions.

7. The electronic device of claim 1, wherein when the base cover is attached to a main unit case, the base cover is level with the main unit case.

8. An electronic device comprising:
a housing;
a keyboard unit attached to the housing; and
a cover comprising a plurality of through holes through which keys of the keyboard unit are inserted, and a depression provided in one of peripheral surfaces of the through holes and used to detach the keyboard unit wherein at least a portion of the depression is exposed to an outside when the keys are pressed down and wherein the depression is not exposed to an outside when the keys are not pressed down.

9. The electronic device of claim 8, wherein the depression is provided separate from a surface of the housing to permit an external member to insert therein.

10. The electronic device of claim 9, wherein the depression is provided in a front surface of the one of peripheral surfaces.

11. The electronic device of claim 9, wherein the depression opens in the one of peripheral surfaces of the through holes and extends perpendicular to a direction of a thickness of the cover.

12. An electronic device comprising:
a housing;
a keyboard unit attached to the housing; and
a cover comprising a plurality of through holes through which keys of the keyboard unit are inserted, and a depression provided in one of peripheral surfaces of the through holes and used to detach the keyboard unit,
wherein the depression is provided separate from a surface of the housing to permit an external member to insert therein, the depression is provided in a front surface of the one of the peripheral surfaces.

13. The electronic device of claim 12, wherein at least a portion of the depression is exposed to an outside to permit an external member to insert therein, when the keys are pressed down.

14. The electronic device of claim 12, wherein the depression opens in the one of peripheral surfaces of the through holes and extends perpendicular to a direction of a thickness of the cover.

15. The electronic device of claim 12, wherein the depression is provided near an end of a length of the keyboard unit.

16. The electronic device of claim 12, wherein
the keyboard unit includes a ten-key; and
the through holes include a certain number of through holes arranged in a rearmost one of the rows, and two through holes arranged near opposite ends of the rearmost row, and one through hole arranged near a center of the rearmost row, are defined by peripheral surfaces provided with the depressions.

* * * * *